US012567025B2

(12) United States Patent
Raghunathan et al.

(10) Patent No.: US 12,567,025 B2
(45) Date of Patent: Mar. 3, 2026

(54) SYSTEM AND METHOD FOR PROACTIVE AGGREGATION

(71) Applicant: DoorDash Inc., San Francisco, CA (US)

(72) Inventors: Rohit Raghunathan, New York, NY (US); Dananjayan Thirumalai, Bothell, WA (US); Chang Zhu, San Francisco, CA (US); Kyle Hsiao, San Francisco, CA (US); Li Pei, Jersey City, NJ (US)

(73) Assignee: DoorDash, Inc., San Francisco, CA (US)

( * ) Notice: Subject to any disclaimer, the term of this patent is extended or adjusted under 35 U.S.C. 154(b) by 203 days.

(21) Appl. No.: 17/731,699

(22) Filed: Apr. 28, 2022

(65) Prior Publication Data

US 2022/0351120 A1     Nov. 3, 2022

Related U.S. Application Data

(60) Provisional application No. 63/180,855, filed on Apr. 28, 2021.

(51) Int. Cl.
G06Q 10/087     (2023.01)
G06N 20/00     (2019.01)
G06Q 10/083     (2024.01)

(52) U.S. Cl.
CPC ........... G06Q 10/087 (2013.01); G06N 20/00 (2019.01); G06Q 10/083 (2013.01)

(58) Field of Classification Search
CPC ..... G06Q 10/087; G06Q 10/083; G06N 20/00
See application file for complete search history.

(56) References Cited

U.S. PATENT DOCUMENTS

| | | | |
|---|---|---|---|
| 6,384,850 | B1 | 5/2002 | McNally et al. |
| 6,871,325 | B1 | 3/2005 | McNally et al. |
| 6,982,733 | B1 | 1/2006 | McNally et al. |
| 8,146,077 | B2 | 3/2012 | McNally et al. |
| 9,009,060 | B2 | 4/2015 | McNally |
| 9,747,651 | B2 | 8/2017 | McNally |
| 10,970,797 | B2 | 4/2021 | McNally |

(Continued)

FOREIGN PATENT DOCUMENTS

WO          0122289 A1     3/2001

OTHER PUBLICATIONS

Yuankai Zhang, Order consolidation for the last-mile split delivery in online retailing, Dec. 2018, Transportation Research Part E, pp. 309-327 (Year: 2018).*

(Continued)

*Primary Examiner* — Aaron N Tutor
(74) *Attorney, Agent, or Firm* — Kilpatrick Townsend & Stockton LLP

(57)          ABSTRACT

A method is described. The method includes determining, by a central server computer using a machine learning model, aggregates of items that are likely to be ordered by end users. The method also includes initiating placement of the items in the aggregates of items in one or more locations based on locations of the end users, receiving a request for an aggregate of items, and initiate the fulfillment of the request for the aggregate of items, where the items in the aggregates of items are at the one or more locations.

14 Claims, 6 Drawing Sheets

RECEIVE ORDER DATA
610

TRAIN PREDICTION MODEL USING ORDER DATA
612

DETERMINE STORAGE CAPACITY AT SERVICE PROVIDERS AND INTERMEDIATE LOCATIONS
614

DETERMINE PREDICATED AGGREGATES
616

COMMUNICATE WITH SERVICE PROVIDER COMPUTERS AND/OR TRANSPORTER DEVICES TO FULFILL PREDICTED BUNDLES
618

PRESENT AGGREGATES TO END USERS
620

RECEIVER ORDER
622

COMMUNICATE WITH TRANSPORTERS AND SERVICE PROVIDERS
624

RECEIVE COMMUNICATION FROM TRANSPORTER
626

PROCESS INTERACTION
628

UPDATE STORAGE CAPACITY DATA
630

UPDATE MACHINE LEARNING MODEL
632

(56) References Cited

U.S. PATENT DOCUMENTS

| | | | |
|---|---|---|---|
| 11,276,130 | B2 | 3/2022 | McNally |
| 11,741,528 | B1 * | 8/2023 | Gjertson ............ G06Q 30/0631 |
| | | | 705/26.7 |
| 11,842,415 | B2 | 12/2023 | McNally |
| 11,847,587 | B1 | 12/2023 | McNally |
| 2014/0249937 | A1 | 9/2014 | McNally |
| 2020/0387867 | A1 * | 12/2020 | Clarke .............. G06Q 30/0226 |
| 2021/0067744 | A1 * | 3/2021 | Buibas ................... G06F 3/012 |
| 2023/0088950 | A1 * | 3/2023 | Tadeu de Paula ... G06Q 10/047 |
| | | | 705/338 |

OTHER PUBLICATIONS

Civil Action No. 2:23-CV-2165-WSH, Amended Complaint for Patent Infringement—*Ameranth, Inc., Plaintiff*, V. *Doordash, Inc., Eat'n Park Restaurants, LLC, and Eat'n Park Hospitality Group, Inc.*, Defendants, Sep. 17, 2024, pp. 1-91.
Unpublished U.S. Appl. No. 18/145,942, filed Dec. 23, 2022.

* cited by examiner

SYSTEM AND METHOD FOR PROACTIVE AGGREGATION

CROSS-REFERENCES TO RELATED APPLICATIONS

This application is a non-provisional of U.S. provisional patent application No. 63/180,855, filed on Apr. 28, 2021, which is herein incorporated by reference in its entirety.

BACKGROUND

Existing delivery systems for items such as physical goods, food, etc. can be inefficient when an end user wishes to obtain multiple items from multiple service providers through delivery services. For example, an end user seeking to obtain different items from different service providers may be required to initiate different orders with the different service providers for the different items. In such cases, different couriers may obtain the items from the different service providers and may deliver them to the end user. For example, if an end user wants to obtain three different items from three different service providers, then three different couriers may separately obtain and deliver the three different items to the end user. This is inefficient and time consuming.

Instead of using multiple couriers, a single courier could retrieve items from different service providers and deliver them to the end user. However, this can also be inefficient and problematic. This is because the single courier independently travels to each of the service providers to obtain the items before delivering them to the end user. The delivery of the bundle of items to the end user may be delayed if the different service providers are not proximate to each other. The delivery of the bundle of items can also be delayed if one of the service providers is slow to provide its item to the courier.

The delayed delivery of the bundle of items to the end user is particularly problematic for the end user if some items in bundle are more important than other items in the bundle. For example, an end user may have a delivery service application on a mobile phone. The end user can use it to obtain three items A, B, and C, respectively provided by three different service providers. The end user may want to receive item A as a priority item and may want to receive it as quickly as possible. However, the user may also like to have items B and C if they are readily available. If the end user orders items A, B, and C, and the service provider that provides item B takes a long time to provide item B, then the delivery of the entire bundle of items A, B, and C will be substantially delayed to the end user. As a result, the delivery of the priority item A to the end user will also be delayed. This is an undesirable result for the end user.

Embodiments of the invention address these and other problems, individually and collectively.

BRIEF SUMMARY

Embodiments of the invention can improve the efficiency of delivering aggregates of items from different service providers to an end user.

One embodiment includes a method comprising: determining, by a central server computer using a machine learning model, aggregates of items that are likely to be ordered by end users; initiating, by the central server computer, placement of the items in the aggregates of items in one or more locations based on locations of the end users; after the placement of the items in the aggregates of items in the one or more locations, receiving, by the central server computer, a request for an aggregate of items; and initiate, by the central server computer, the fulfillment of the request for the aggregate of items, wherein the items in the aggregates of items are at the one or more locations.

Another embodiment includes a central server computer comprising: a processor; and a non-transitory computer readable medium. The non-transitory computer readable medium comprises code, executable by the processor, to perform operations including: determining, using a machine learning model, aggregates of items that are likely to be ordered by end users; initiating placement of the items in the aggregates of items in one or more locations based on locations of the end users; after the placement of the items in the aggregates of items in the one or more locations, receiving, by the central server computer, a request for an aggregate of items; and initiate, by the central server computer, the fulfillment of the request for the aggregate of items, wherein the items in the aggregates of items are at the one or more locations.

These and other embodiments are described in further detail below.

DETAILED DESCRIPTION

Figure 1:
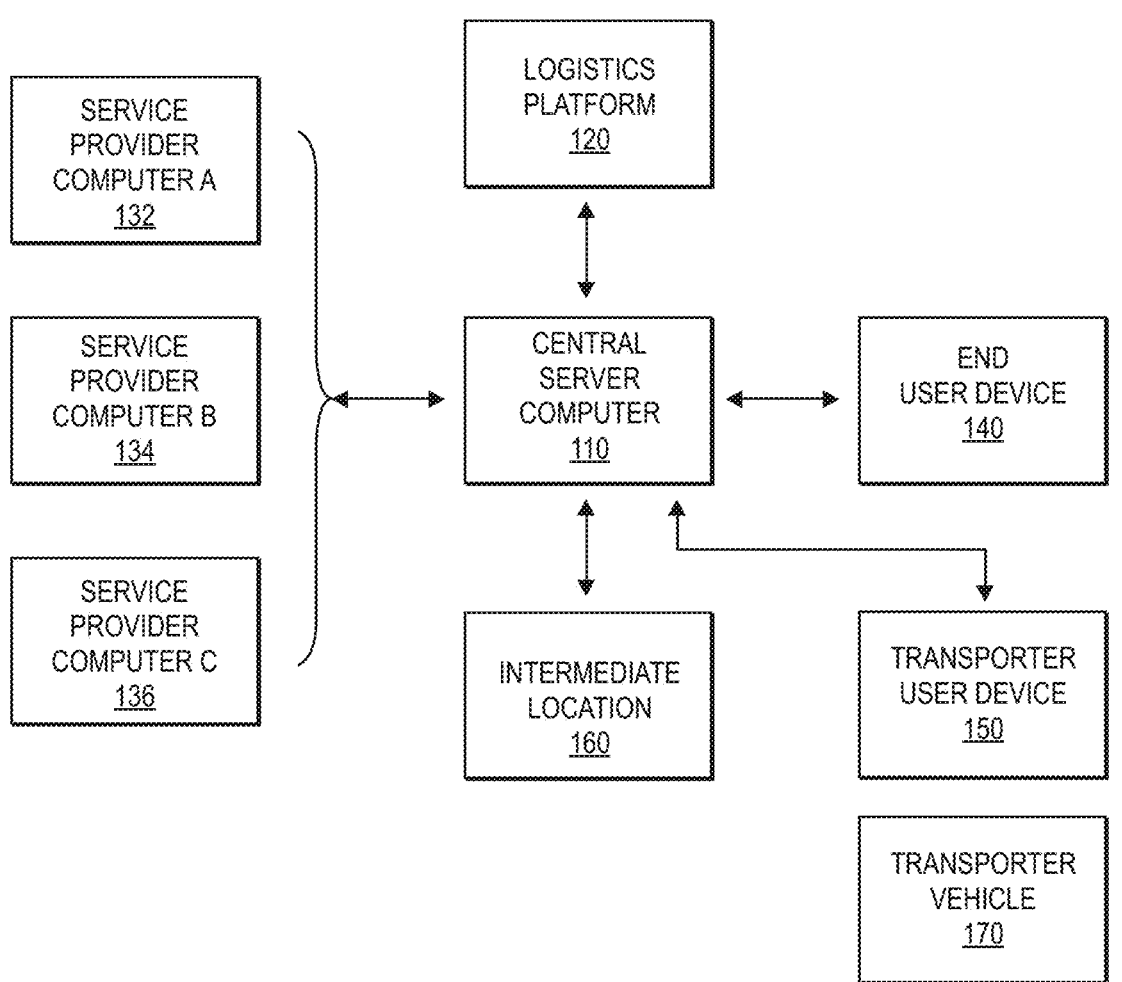
FIG. 1 shows a block diagram of a system according to embodiments.

Embodiments of the disclosure can optimally place inventory items according to type, quantity, location, etc. based on end user demand and relevance to service providers (e.g., merchants). Embodiments can include creating an inventory-aware transporter match algorithm that allows transporters to rapidly deliver aggregates of items. Embodiments of the disclosure can increase the sale/conversion of bundle offers for aggregate items due to faster and high-quality fulfillment. Embodiments can also reduce the cost of delivering aggregates of items.

Prior to discussing specific embodiments of the invention, some terms can be described in further detail.

An "item" can be an individual article or unit. Examples of items can include perishable items such as food items, beauty items (e.g., cosmetics), office supply products (e.g., staples, paper, and ink), hardware items (e.g., nails, hammers, wrenches), electronic devices (e.g., computers, phones, etc.), jewelry, etc.

A "user" may include an individual. In some embodiments, a user may be associated with one or more personal accounts and/or mobile devices. In some embodiments, the user may be a consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with other entities. Examples of user devices may include a mobile device, a laptop or desktop computer, a wearable device, etc.

A "server computer" is typically a powerful computer or cluster of computers. For example, the central server computer can be a large mainframe, a minicomputer cluster, or a group of servers functioning as a unit. In one example, the central server computer may be a database server coupled to a Web server. The central server computer may also be a cloud based server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "fulfillment request" can be a request to provide one or more items. For example, a fulfillment request can include an initial communication from an end user device to a central server computer for a service provider computer to fulfill a purchase request for an item such as food.

A "transporter" can be an entity that transports something. A transporter can be a person that transports an item using a transportation device (e.g., a car). In other embodiments, a transporter can be a transportation device that may or may not be operated by a human. Examples of transportation devices include cars, boats, scooters, bicycles, drones, airplanes, etc.

"Machine learning" can include an artificial intelligence process in which software applications may be trained to make accurate predictions through learning. The predictions can be generated by applying input data to a predictive model formed from performing statistical analyses on aggregated data.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on feature vectors or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

In embodiments, a central server computer comprising a machine learning module that can incorporate a machine learning model can predict the demand for aggregates of items that end users are likely to request or purchase, the specific end users that may request the item aggregates, and the most efficient routes to deliver the aggregates of items to the end users. In embodiments, the central server computer can use a trained machine learning model to predict that a particular aggregate (or bundle) of items is likely to sell at a particular time and in a particular locale, and optionally for a particular end user or end user type. As an illustration, the central server computer can predict the demand for related food items (e.g., carbonated beverages, potato chips, etc.) based on items main menu items (e.g., pizza) at a particular service provider. In some embodiments, when an end user is shopping for items to purchase on a delivery service application, the central server computer can provide the predicted aggregates of items as purchase opportunities. This can be advantageous if the sales volume of predicted aggregated items do not meet expected targets or if items in certain aggregates need to be sold for other reasons (e.g., shelf-life, profitability, etc.).

The central server computer can then initiate the proactive placement of the items of service providers at other service provider locations or intermediate locations so that they are easily accessible to transporters that will obtain the items for end users. The bundle items from the different service providers can be strategically placed or arranged at predetermined locations so that transporters can rapidly collect the items in the aggregates and deliver them to the requesting end users. The placement or arrangement of items can be made before any requests for the item aggregates are made by end users (e.g., before orders are placed for bundles of items). In embodiments, the items in the aggregates can be placed at locations that decrease the fulfillment time and/or expense associated with the delivery of those aggregates to the end users, thereby improving the efficiency of the delivery of the item aggregates to the end users.

In some cases, the central server computer can initiate the proactive placement of those items by communicating with service providers to ask them to deliver or supply their items to the locations of other service providers, or intermediate locations. In other cases, the central server computer can initiate the proactive placement of items by communicating with one or more transporters who will deliver the items from the service providers that originate the items to the locations of other service providers or intermediate locations.

Once the end user has requested an aggregate of items from the central server computer, the transporter can pick up the items (e.g., food) in the aggregate and deliver them to the end user. As noted above, the items in the aggregate of items have been proactively placed to specific locations that make it easy and efficient for a transporter to obtain and deliver the items in the aggregate of items to the end user.

Illustratively, a central server computer using the machine learning model may predict that end users that purchase pepperoni pizza at a particular pizza parlor subsequently order ice cream from a nearby ice cream store (e.g., more than fifty percent of the time). The machine learning model may have been trained using past end user purchase data. The quantity of ice cream transported from the ice cream store to the pizza parlor and stored at the pizza parlor in a given time period may be a predicted amount of ice cream that would be purchased with pizza at the pizza parlor in the given time period.

Before or after this prediction is made, the central server computer can determine the available freezer storage for any additional ice cream from the ice cream store. This determination can be performed automatically by detecting available freezer space in the pizza parlor's freezer using sensors in the freezer. Alternatively, the central server computer can communicate with the pizza parlor and may ask if there is sufficient freezer space for a predetermined quantity and/or volume of ice cream from the ice cream shop.

After the central server computer determines the predicated quantity of ice cream that would be sold with the pizza produced by the pizza parlor and after the central server computer determines that the pizza parlor has sufficient freezer space to store the ice cream in a given time period, the central server computer can initiate the process of transporting the ice cream from the ice cream store to the pizza parlor. In some cases, the central server computer can send a message to the ice cream store to provide the predicted amount of ice cream to the pizza parlor when the pizza parlor is open for business. In other cases, the central server computer can communicate with transporters that can deliver the ice cream to the pizza parlor.

At some point, an end user will order a bundle of items including pizza from the pizza parlor and ice cream from the ice cream store using a delivery application on the end user's user device. The delivery application may communicate the order to the central server computer. After receiving the order, the central server computer can initiate the fulfillment of the order by communicating with at least the transporter and the pizza parlor. Instead of stopping by both the pizza parlor and the ice cream store to pick up the pizza and ice cream (i.e., the aggregate of items), the transporter only needs stop by the pizza parlor to pick up both the pizza and the ice cream. Thus, the delivery of the bundle of items is faster using embodiments of the invention than conventional methods for creating bundles of items and delivering them to end users.

In some embodiments, items to be bundled can be placed with transporters. In this case, the central server computer can predict the demand for items that can be aggregated or bundled independent of service providers that might be producing certain items (e.g., food) on demand. In such embodiments, the central server computer can determine that specific bundles of items are desired by end users, and specific items in the bundles can be picked up by the transporters before they are delivering specific items from specific service providers for end users. For example, the central server computer may determine that carbonated beverages are often purchased with hamburgers made at a particular restaurant. However, the restaurant may not sell carbonated beverages. The transporter can proactively pick up carbonated beverages from a convenience store and may store them in the transporter's vehicle before the transporter starts delivering items from various service providers to end users. When the central server computer receives an order for a hamburger from the restaurant and a carbonated beverage from the convenience store, the central server computer may communicate this order to a transporter operating a transporter user device. The transporter can then retrieve the hamburger from the restaurant and can deliver the hamburger and the carbonated beverage to the end user without stopping by the convenience store. In embodiments, when an end user places an order for a bundle of items, the central server computer can optimize a matching algorithm to match orders to a transporter who already has the item inventory to fulfill the delivery of the ordered bundle of items.

In still other embodiments, items can be placed with certain entities at certain geographical areas that are not necessarily active merchants or transporters. For example, items can be placed in intermediate locations that have vending machines, refrigerators, storage lockers, kitchens, etc., in key geographical areas within a locale. For instance, a temperature-controlled storage locker could be placed in a parking lot at a well-traveled intersection in a city. Items in predicted aggregates or bundles may be placed in the temperature-controlled storage locker. Transporters who are delivering bundles of items to various end users in the city can pick up items for bundles at the temperature-controlled storage locker instead of at the locations of the service providers that produced the items.

FIG. 1 shows a system according to embodiments. FIG. 1 shows a number of components, but there can be more or fewer components in the system in embodiments of the invention. For example, although three service provider computers are shown in FIG. 1, there can be more than three service provider computers in other embodiments of the invention.

The system in FIG. 1 includes a central server computer 110 in communication with an end user device 140, and one or more transporter user devices 150. The one or more transporter devices 150 may be operated by one or more transporters (e.g., delivery couriers), who may travel in one or more transporter vehicles 170 (e.g., cars). The central server computer 110 may also be in communication with a logistics platform 120 and an intermediate location 160. The intermediate location 160 may include a kitchen, a vending machine, a temperature-controlled storage facility, etc. The intermediate location 160 can be a transport hub.

The central server computer 110 may be in communication with one or more service provider computers including a first service provider computer A 130A, second service provider computer B 130B, and a third service provider computer C 130C. The first, second, and third service provider computers A-C 130A-130C may be operated by first, second, and third service providers (e.g., three different merchants or restaurants), respectively. Each service provider may provide a different type of item that can form part of an aggregate of items. The first, second, and third service provider computers A-C 130A-130C can communicate with the central server computer 110 via one or more APIs. Service providers may initially present items such as goods and/or services to end users via an application (e.g., a delivery application) on the end user device 140. In some embodiments, an end user can interact with the application on the end user device to purchase items from the service providers.

The logistics platform 120 can include a location determination system, which can determine the location of various user devices such as transporter user devices (e.g., transporter user device 150) and end user devices (e.g., end user device 140). The logistics platform 120 can also include routing logic to efficiently route transporters using the transport user devices to various service providers that have the items that are to be delivered to the end users. Efficient routes can be determined based on the locations of the transporters, the locations of the service providers, the locations of the end users, as well as external data such as traffic patterns, the weather, etc. The logistics platform 120 can be part of the central server computer 110 or can be system that is separate from the central server computer 110.

The communication networks that allow the entities in FIG. 1 to communicate may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

Figure 2:
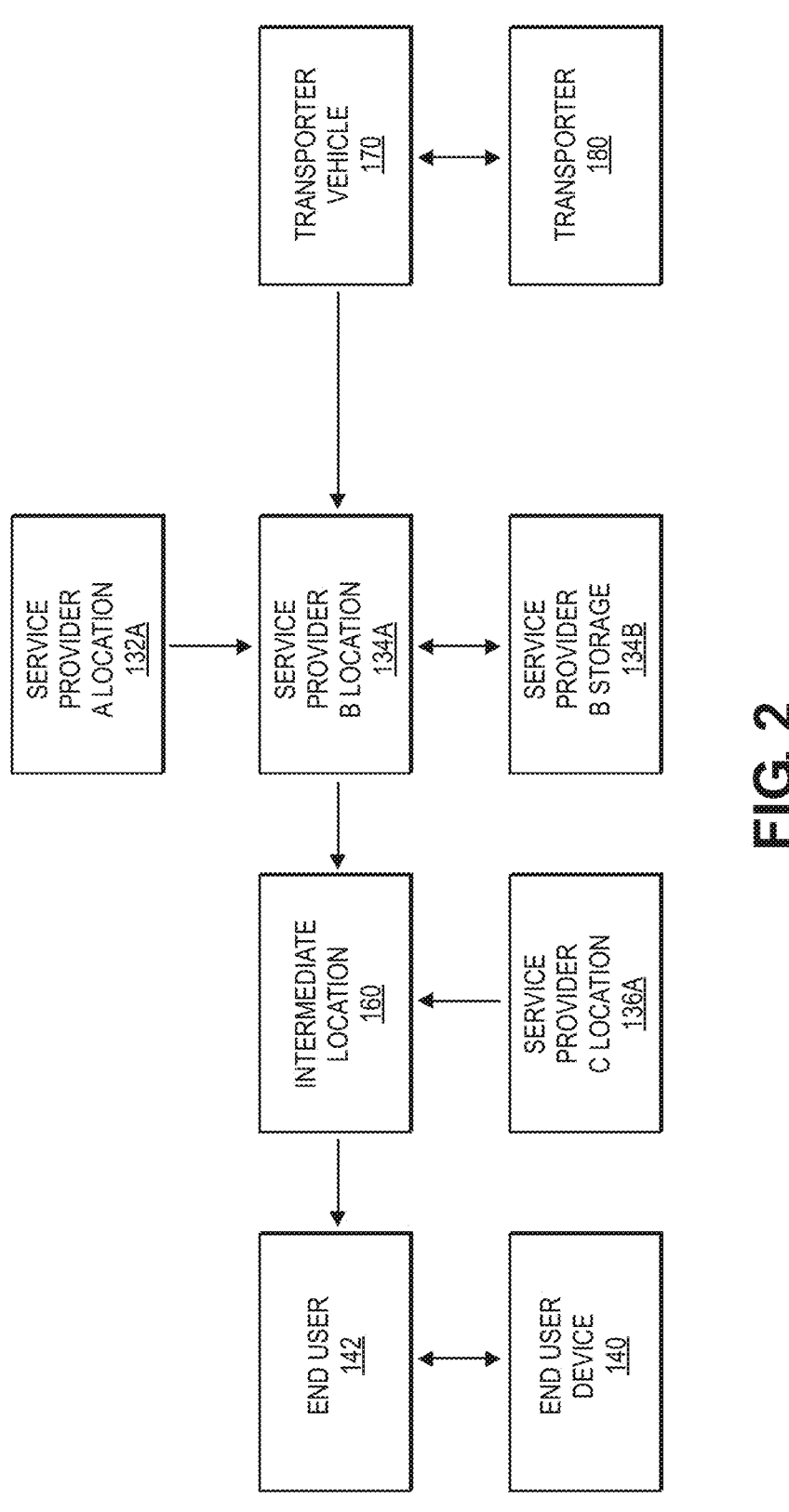
FIG. 2 shows diagram illustrating delivery of an aggregate of items to an end user according to embodiments.

FIG. 2 shows a diagram illustrating delivery of an aggregate of items to an end user according to embodiments. In the scenario illustrated in FIG. 2, a machine learning model in the central server computer 110 in FIG. 1 can predict that during a particular time period on a particular day (e.g., 5-9 pm on a Saturday), users in a particular locale are likely to purchase items produced by service provider A when orders are placed for items produced by a service provider B. The machine learning model can also predict that items produced by service provider C are also likely to be purchased by end users when orders are placed for items produced by service provider B. For example, service provider B may sell barbeque, service provider A may sell pies, and service provider C may sell freshly squeezed juice. Based on at least in on past interaction data, the machine learning model may predict that this particular bundle of items is likely to be purchased by a large number of end users during the time period.

The central server computer 110 can determine the most efficient and effective delivery path for obtaining the items in the bundles for potential end users that given at least the physical locations of service providers A, B, and C, the nature of the items being delivered (e.g., one item is best delivered hot whereas another item could be delivered at room temperature), the likely end users that may be purchasing the bundles, and external data such as traffic patterns. For example, in this specific example, given that the barbeque is best delivered hot, pies can be delivered at room temperature, and freshly squeezed juice is best delivered cold, the most efficient and effective path for any transporters to deliver this bundle would be to first stop at service provider B's location 134A to pick up the barbeque and the pie, and then the intermediate location 160 to pick up the freshly squeezed juice. The central server computer 110 can then optionally determine the storage capacity for items at the service provider B location 134B and the intermediate location 160 to ensure that there is sufficient room and/or capabilities to store items from other service providers.

In anticipation of the potential purchase of the bundle items produced by service provider B with items produced by service provider A and service provider C, the central server computer 110 can provide instructions to service providers A, B, and C. The central server computer 110 can then provide an instruction to service provider A to produce a certain number of items for delivery from the service provider A location 132A to the service provider B location 134A. The items produced by service provider A may be transported to the service provider B location 134A in any suitable manner (e.g., service provider A may deliver the items to service provider B, an independent transporter may be used to transport the items from service provider A to service provider B, etc.). Once at the service provider B location 134B, the items from service provider A can be stored in the service provider B storage 134B. The service provider B storage may be a device with a temperature-controlled environment (e.g., a refrigerator).

The central server computer 110 can also provide an instruction to service provider C to produce a certain number of items for delivery from the service provider C location to the storage at intermediate location 160. The service provider C location 136A may be closer to the intermediate location 160 than the service provider B location 134A, so it is more efficient and effective to transport the items produced by service provider C to the storage (e.g., a refrigerator) at the intermediate location 160. The intermediate location 160 may be between the service provider B location 134A and potential end users, may have ample parking, and may be proximate to a central intersection.

At some point in time, an end user 142 can use the end user device 140 to place an order for the above-described bundle of items from service providers A, B, and C using the central server computer 110. The end user 142 can use a delivery application on the end user device 140 to order the bundle of items. The delivery application can communicate with the central server computer 110. The central server computer 110 can communicate with the service provider B at the service provider B location 134A and can communicate with a transporter 180 operating the transporter vehicle 170.

The transporter 180 operating the transporter vehicle 170 can deliver the bundle of items the end user 142. The transporter operating the transporter vehicle 170 can then drive to the service provider B location and can pick up the one or more items (e.g., barbeque) produced by service provider B along with the one or more items (e.g., pie) produced by service provider A and stored in the service provider B storage 134B. After those items are obtained at the service provider B location, the transporter may drive the transporter vehicle to the intermediate storage location 160 to pick up the one or more items (e.g., freshly squeezed juice) produced by service provider C. After the transporter obtains the items produced by service provider C, the transporter can drive to the end user location to deliver the items from service providers A, B, and C to the end user 142.

Note that in this illustration, the transporter did not have to travel to service provider A at service provider A location 132A and service provider C at the service provider C location 138A to obtain the items that they produced. The end user 142 is able to quickly and efficiently obtain the desired bundle of items.

Figure 3:
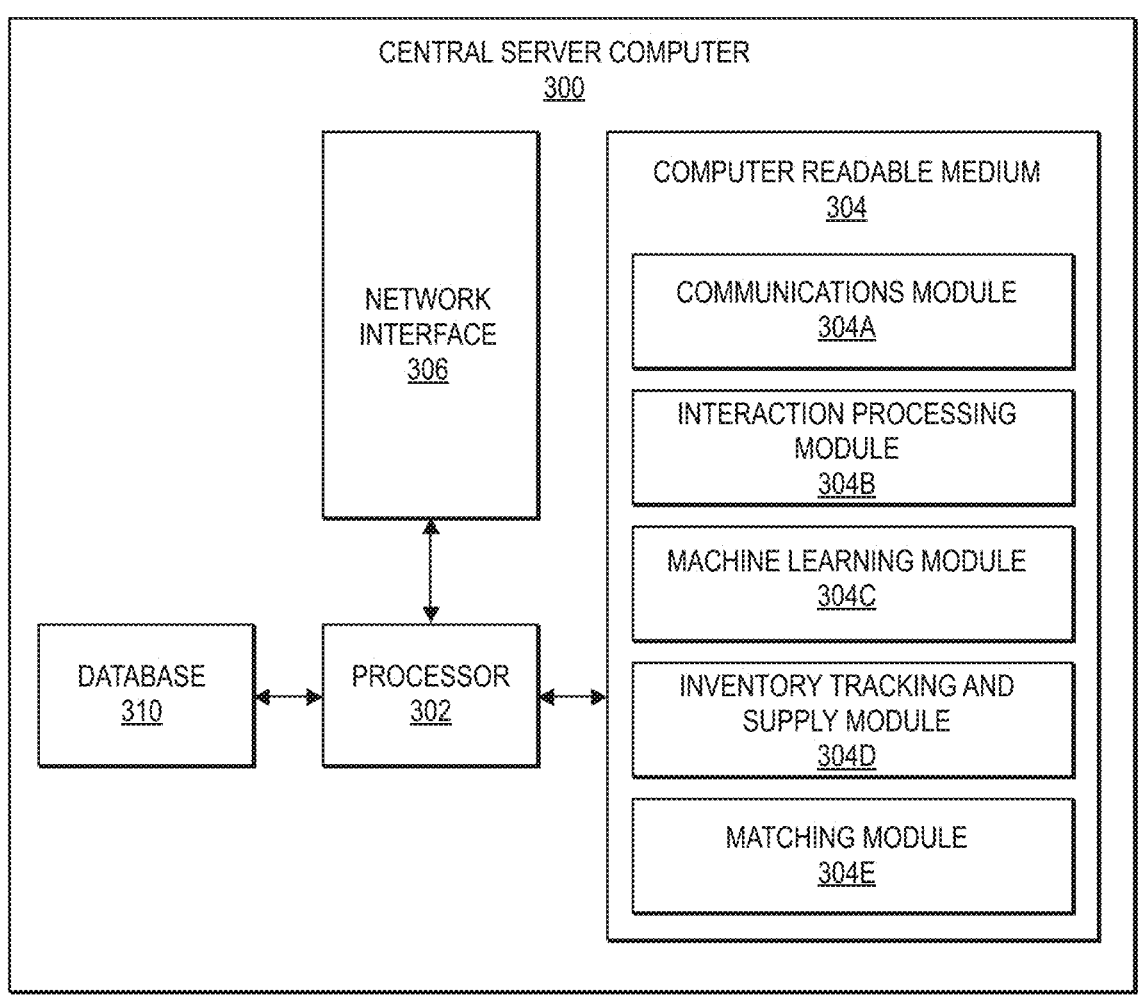
FIG. 3 shows a block diagram of a central server computer according to an embodiment.

FIG. 3 shows a diagram of a central server computer 300 according to embodiments. The central server computer 300 may comprise a processor 302, which may be coupled to a computer readable medium 304, a network interface 306, and a database 310.

The database 310 may store data regarding the items (e.g., data regarding items such as food to be offered for sale, descriptions of the items (e.g., the name of the item, the type of item, the characteristics of the item, etc.), image data of images of the items, service provider identifiers, dates of service provider or item availability, prices of items, etc.) of all services providers interacting with the central server computer 300. If the items are items of food, then information about the food can be included in the database. Such information can be information about whether the food is served hot or cold, the shelf-life or time that the food has optimal taste, complimentary food types, etc. The database 310 may also store data relating to past interactions by end users. Such past interaction data may include the names of the service providers, the items ordered for each interaction, the total amounts of each order, the time required to fulfill each order, the transporter(s) involved in each order, the time and date that each order was started and fulfilled, the form of payment used for each order, etc. Other data that may be stored in the database 310 may include information about routes between various service providers and population centers. For example, information about roads or routes that may or may not be recommended may be included in the database 310. Any of this data can be used as feature data to train the machine learning model 304C.

The network interface 306 may include an interface that can allow the user device 300 to communicate with external computers. The network interface 306 may enable the user device 300 to communicate data to and from another device (e.g., a card, an item provider computer, etc.). Some examples of the network interface 306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 304 may be a non-transitory computer readable medium and can comprise several software modules including a communication module 304A, an interaction processing module 304B, a machine learning module 304C, an inventory tracking and supply module 304D, and a matching module 304E.

The communication module 304A in conjunction with the processor 302 can allow the central server computer to communicate with various entities (e.g., user devices, server provider computers, etc.). The communications module 304A can include various APIs, and communication and security protocols to allow for such communications.

Figure 5:
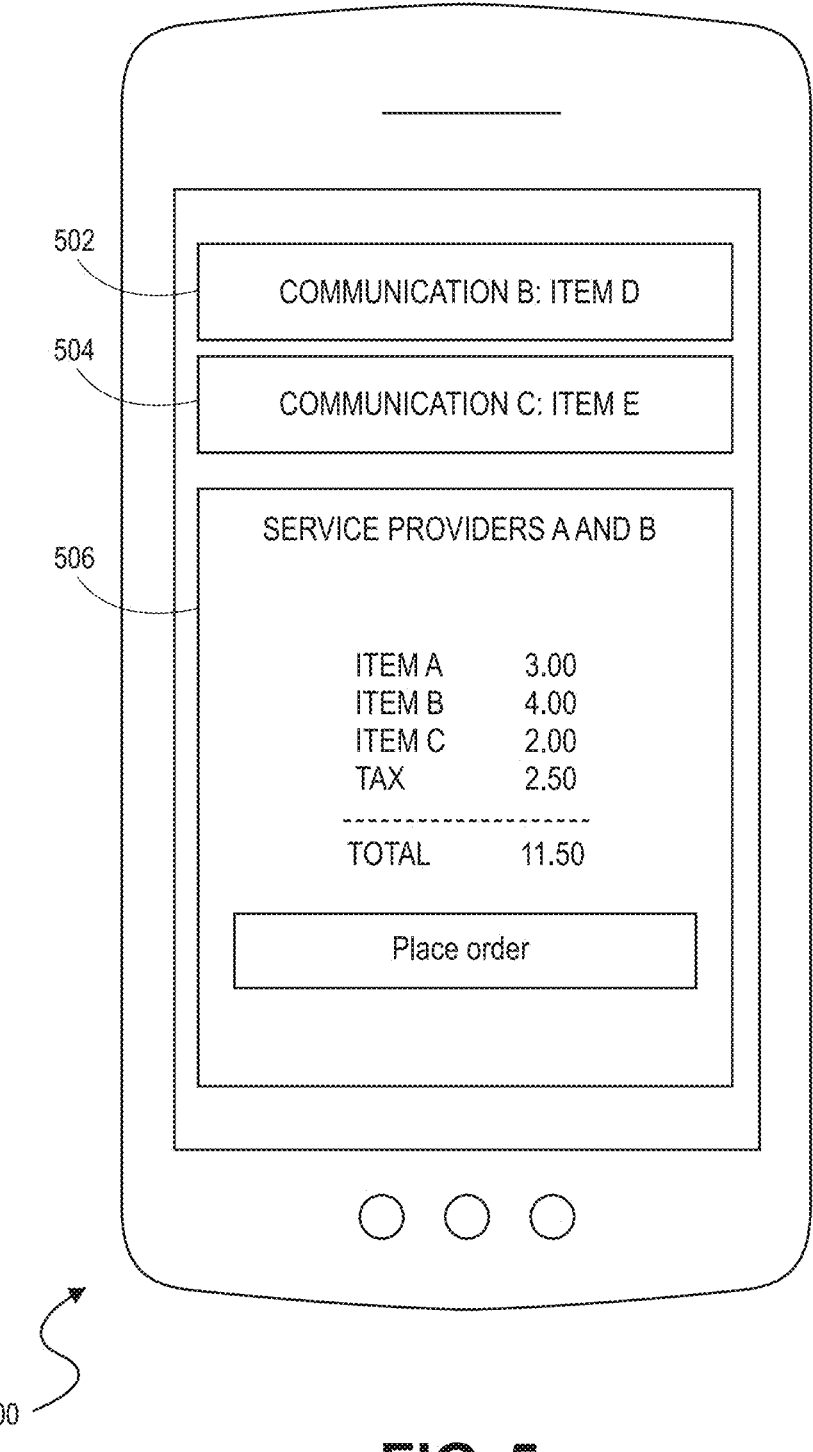
FIG. 5 shows a user device displaying an aggregate of items that can be obtained by a user.

The interaction processing module 304B can comprise code, executable by the processor 302 to perform interactions (e.g., transactions) between service providers and end users. The interaction processing module 304B may comprise code, executable by the processor 302, to present items and service providers to end users via applications on end users' mobile devices, and then receive selections of items by end users and processing orders for the selected items. An example of a user interface that can be facilitated by the interaction processing module 304B is shown in FIG. 5. The interaction processing module 304B and the processor 302 can also coordinate payments between the end users, their financial institutions, and the various service providers involved in the interactions.

The machine learning module 304C, in conjunction with the processor 302, can predict a number of outcomes including bundles of items from different service providers that might be purchased by end users. The machine learning module 305C may encode, train, and update a machine learning model based at least on past order data of end users.

The inventory tracking and supply module 304D in conjunction with the processor 302 can monitor the storage capacity at various service provider and intermediate locations. As noted above, the information regarding the storage capacity at the service providers and intermediate locations can be used to determine the quantities of items that are to be supplied from the service providers to other service provider locations or intermediate locations to prepare for the fulfillment of predicted bundles of items that may be purchased by end users. The inventory tracking and supply module 304D can also monitor the number and types of items that are stored at any location in real time. It can also keep track of the age of the stored items so that real time determinations can be made as to whether delivery of such items is still possible or desirable without degrading the quality of the items. In this regard, the items could be provided with machine readable codes (barcodes) which can be linked to information about the origin and creation of the items. These codes can be scanned at the storage locations and can be provided to the central server computer 300. The inventory tracking and supply module 304D and the processor 302 can use this information to manage the inventories of the items at the different locations.

In some embodiments, the inventor tracking and supply module 304D may maintain a dynamic table that is updated on a regular basis. The dynamic table (e.g., stored in a volatile or semi-volatile memory) may include the service provider or storage location identifiers and information about the service providers and storage locations (e.g., latitude and longitude, names, contact information, current personnel, etc.) in rows, and dynamic information in columns. Examples of dynamic information may include current storage capacities at the service providers or storage locations, the types of items provided by the service providers, the types of items that are preferably received at the service providers or the storage locations, the current items and data pertaining thereto (e.g., expiration dates) stored at the service providers or storage locations, and the identifiers for the service providers provided those current items, the times and dates that certain items entered storage and left storage at the service providers or storage locations, records of communications between the service providers or the storage locations with the central server computer etc. The table can be updated on a continual basis in real-time, or a periodic basis (e.g., every hour).

The matching module 304E, in conjunction with the processor 302, can determine a subset of potential transporters which can deliver items or bundles of items to different end users, and can offer the potential orders to the transporters which the transporters may then accept. The matching module 304E and the processor 302 may coordinate with the logistics platform 120 to identify the locations of the service providers and/or intermediate locations that may be involved in an interaction, and the subset of transporters that may be capable of delivering the items for the interaction.

The computer readable medium 304 may also comprise code, executable by the processor 302 for performing operations including determining, using a machine learning model, aggregates of items that are likely to be ordered by end users; initiating placement of the items in the aggregates of items in one or more locations based on locations of the end users; after the placement of the items in the aggregates of items in the one or more locations, receiving a request for an aggregate of items; and initiate the fulfillment of the request for the aggregate of items, wherein the items in the aggregates of items are at the one or more locations.

Figure 4:
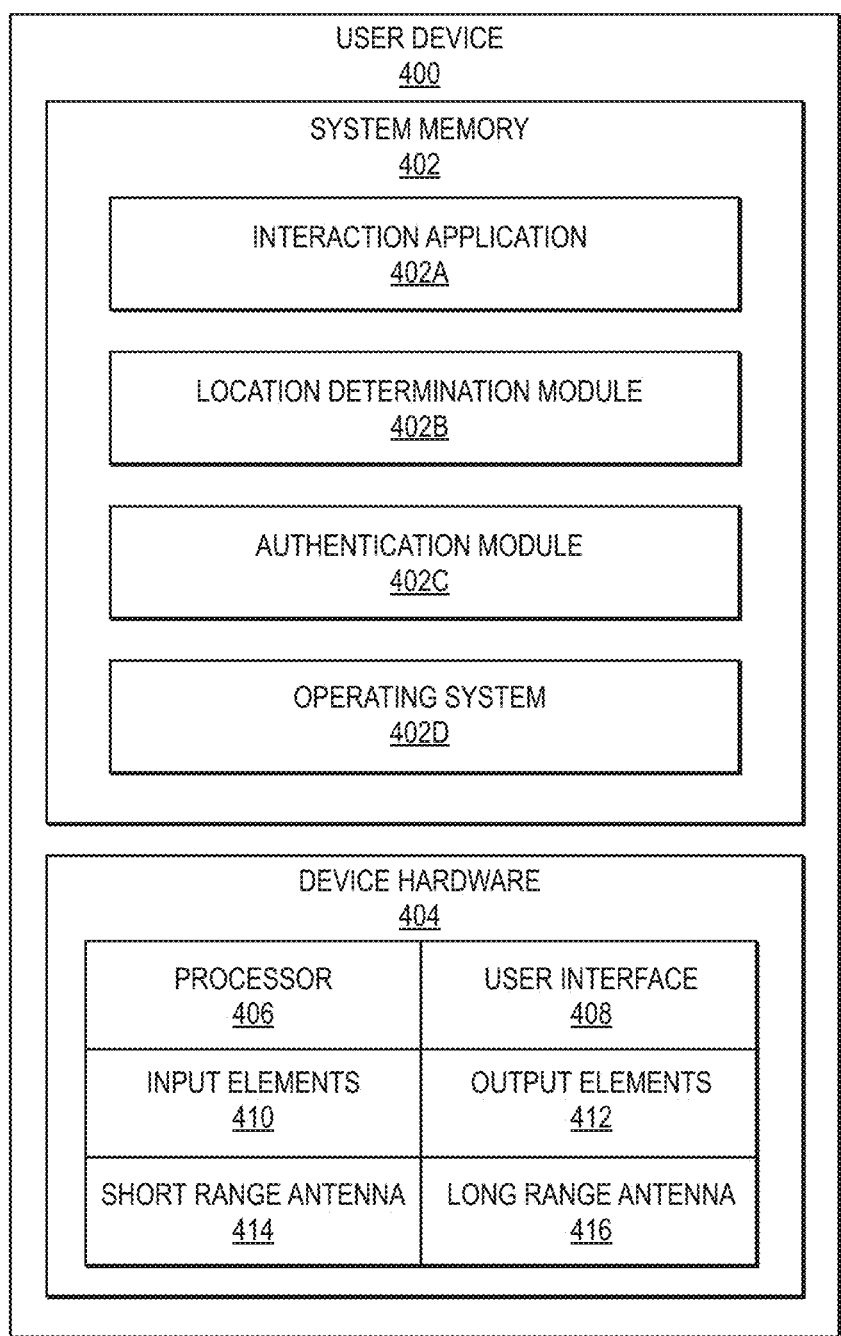
FIG. 4 shows a block diagram of a user device according to an embodiment.

FIG. 4 illustrates a user device 400 according to an embodiment. The user device 400 may include device hardware 404 coupled to a system memory 402.

Device hardware 404 may include a processor 406, a short range antenna 414, a long range antenna 416, input elements 410, a user interface 408, and output elements 412 (which may be part of the user interface 408). Examples of input elements may include microphones, keypads, touchscreens, sensors, etc. Examples of output elements may include speakers, display screens, and tactile devices. The processor 406 can be implemented as one or more integrated circuits (e.g., one or more single core or multicore microprocessors and/or microcontrollers) and is used to control the operation of the user device 400. The processor 406 can execute a variety of programs in response to program code or computer-readable code stored in the system memory 402 and can maintain multiple concurrently executing programs or processes.

The long range antenna 416 may include one or more RF transceivers and/or connectors that can be used by the user device 400 to communicate with other devices and/or to connect with external networks. The user interface 408 can include any combination of input and output elements to allow a user to interact with and invoke the functionalities of the user device 400. The short range antenna 414 may be configured to communicate with external entities through a short range communication medium (e.g. using Bluetooth, Wi-Fi, infrared, NFC, etc.). The long range antenna 416 may be configured to communicate with a remote base station and a remote cellular or data network, over the air.

The system memory 402 can be implemented using any combination of any number of non-volatile memories (e.g., flash memory) and volatile memories (e.g. DRAM, SRAM), or any other non-transitory storage medium, or a combination thereof media. The system memory 402 may store computer code, executable by the processor 406, for performing any of the functions described herein.

The system memory 402 may also store an interaction application 402A, a location determination module 402B, an authentication module 402C, and an operating system 402D. The interaction application 402A and the processor 406 may be a delivery application such as a food delivery application. The interaction application 402A can interact specifically with the central server computer 300, such that the central server computer 300 could be an application server computer. If the user device 400 is a transporter user device, then the interaction application may have code for performing the functions needed for the transporter to deliver the aggregates of items to the end users. The location determination module 402B and the processor 406 can be used to determine a location of the user device 400. The authentication module 402C may comprise code, executable by the processor 406, to authenticate a user. Authentication can be performed using user secrets (e.g., passwords) or user biometrics.

FIG. 5 shows a user device 500 with a user interface which shows a pre-checkout or checkout page. The user interface includes a first portion 506, which can show items ("items A and B") from a first service provider and an item ("item C") from a second service provider that the user has placed into a shopping cart, and a second portion with communications 502, 504. The communications 502, 504 may be advertisements for two items offered for sale by third and fourth service providers. In some embodiments, the communications 502, 504, can be present on store-specific pages, store page banners, post checkout banners, and item offer carousels. The two communications 502, 504 may be presented on the user interface after the user specifically manifested an intent to purchase items A, B, and C from the first and second service providers, but just prior to the user confirming the purchase of the items. The additional items (e.g., items C and D) presented to the end user in the two communications 502, 504 may be complimentary to the items (e.g., items A and B) being purchased by the user from the first service provider.

If the end user wishes to purchase one or both of the items in the communications 502, 504, then this will result in the addition of the selected items(s) in the communication(s) 502, 504 to the list of items to be purchased in the first portion 506 of the user interface. For example, if the end user selects communication 502, then the item (i.e., item D) in the communication 502 is added to the list of items (e.g., items A, B, and C) to purchase in the first portion 506 of the user interface. The bundle of items that is purchased by the end user would include items A, B, and C from the first and second service providers, and item D from the third service provider.

Figure 6:
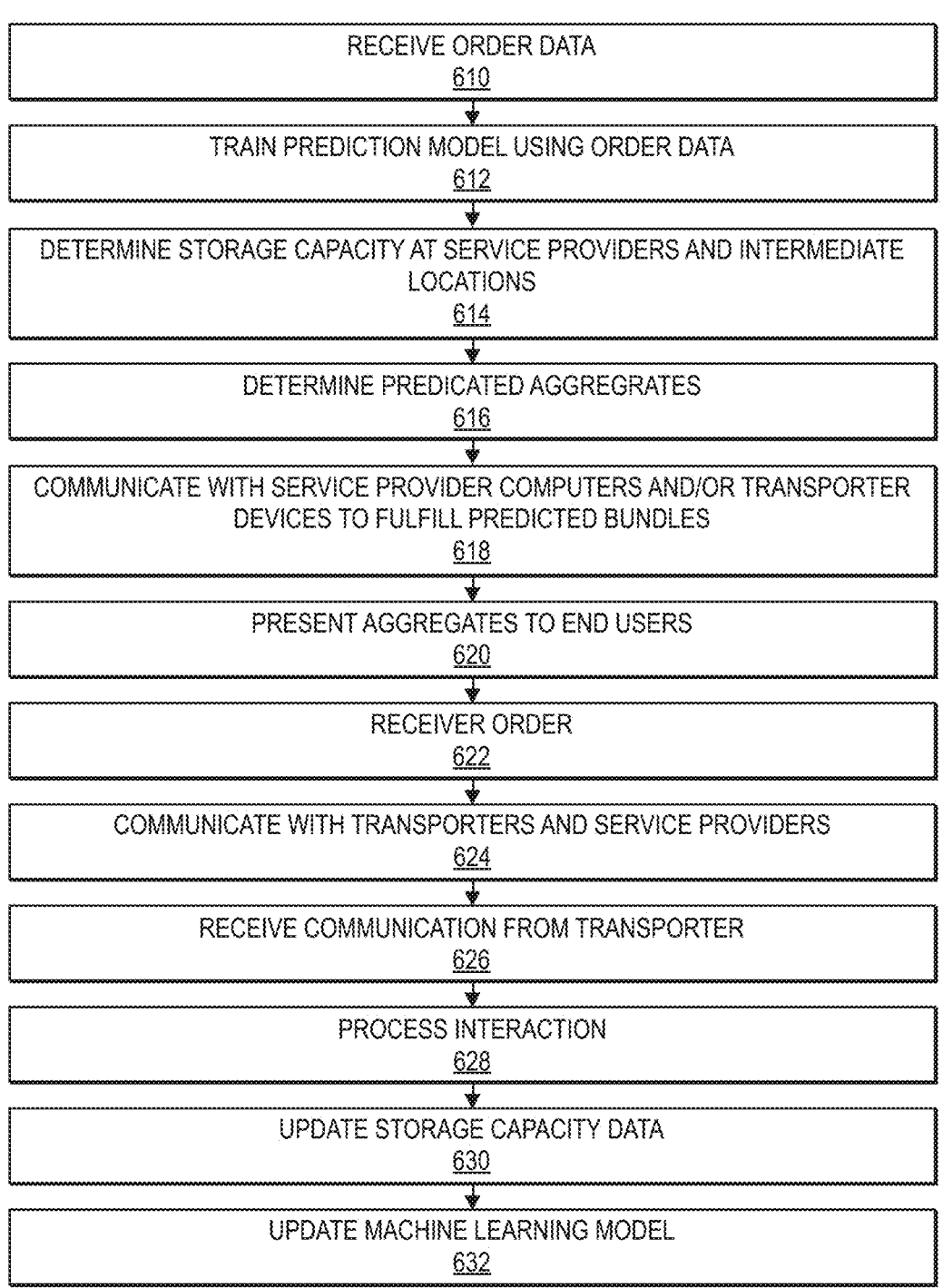
FIG. 6 shows a flowchart illustrating methods according to embodiments of the invention.

Methods according to embodiments of the inventions can be described with respect to FIG. 6.

In step 610, order data is received by the central server computer. The order data can be data from a plurality of end users and a plurality of service providers over time. For example, the order data may include orders for the delivery of items such as food. The order data may be stored in a database of the central server computer may include the items ordered, the cost, the end user (e.g., customer) information (e.g., name, address), the service provider's (e.g., merchant's) name, time of the order, etc.

In step 612, a machine learning model in the central server computer may be trained using the order data as described above. The central server computer may use any suitable machine learning model including neural networks, recurrent neural networks, classification trees, support vector machines, etc.

In step 614, the central server computer can determine the storage capacity of the service providers and the intermediate locations as described above. For example, the central server computer can determine the available storage capacity of a temperature-controlled food locker at an intermediate location. This information can be used to determine how many items and what types of items can be temporarily stored in the temperature-controlled food locker.

In step 616, once the machine learning model has been trained using the order data in the database, the machine learning model can predict demand for aggregates of items of different service providers within a particular geography. The machine learning model can also determine suitable locations to place the items. The locations would be those that would result in the fastest delivery of the aggregates to likely end users requesting the aggregates (e.g., customers that are likely to buy the bundles of items). The machine learning model can predict what types of items are best bundled, the types of service providers (e.g., types of merchants) that might in the best position supply the items, the optimal locations (e.g., at a merchant, with the transporter, or at an intermediate location such as a vending machine) for those items to ensure rapid delivery of the bundles, etc.

In step 618, the central server computer can initiate the placement of bundle items at specific locations in an area. For example, the central server computer can communicate with service provider computers associated with the service providers, and transporters to properly place items in determined locations so that bundles can be readily obtained by transporters when the bundles are ordered. In some embodiments, an inventory management service (i.e., implemented by the inventory tracking and supply module 304D in FIG. 3) can then work to fill inventory based upon the output of the machine learning model. The inventory management service can send messages to various entities to ensure that any items for bundling are placed in their proper locations. For example, the inventory management service can send messages to transporters or service providers to transport various items from one location to another location, so that the items can be aggregated with other items to ensure rapid delivery of any aggregated items.

In step 620, the central server computer can present aggregates of items to end users via the applications on their mobile devices. For instance, in some embodiments, an order service gateway associated with the applications can offer any of the predicted bundles of items for sale, depending upon the inventory. For instance, if the number of predicted aggregated items do not sell as expected, then the central server computer discounts on those aggregated items can be offered to end users to help ensure that they are requested by end users and sold to them.

In step 622, a fulfillment request comprising an order for an aggregate of items may be received by the central server computer from an end user. Once aggregate of items is identified and requested by the end user, the delivery service (i.e., as implemented by the interaction processing module 304B and the matching module 304E in FIG. 3) in the central server computer can then initiate the fulfillment of the order by coordinating the delivery of the items in the aggregate of items to the end user. The central server computer can determine a proposed route (including service provider locations and/or intermediate locations) to obtain each of the items requested by end user as noted above.

In step 624, the central server computer may communicate with potential transporters and service providers. The delivery service in the central server computer can initiate contact any service providers to start preparing any items for delivery (if they have not already been prepared and pre-placed at certain locations). The delivery service can also identify a list of potential transporters to obtain the bundle of items and deliver the bundle of items to the end user. A list of potential transporters may be determined based upon the service provider locations, the end user location, and/or the proposed route to deliver the bundle of items to the end user. For instance, if a particular service provider is identified by the central server computer as being the starting point to deliver the bundle of items to the end user, then transporters that are within a 1 mile radius may be considered suitable candidate transporters fulfilling the order.

In step 626, the central server computer can receive a communication from a transporter that will deliver the aggregate of items. In embodiments, a transporter match service (i.e., as implemented by the matching module 304E in FIG. 3) in the central server computer can match the transporter that agreed to end user's order the order.

In step 628, the interaction can be processed. The central server computer can process the payment for the end user's order. The central server computer can transmit a request with account credentials to the end user's functional institution to approve of the payment for the interaction. Once the payment is approved, the transporter can pick up the aggregated items and can deliver them to the end user as described above.

In step 630, after the items in a bundle of items are obtained from their service provider and/or intermediate locations by the transporter, the storage capacity at the various service provider and intermediate locations can be updated. The inventories of items at the particular locations are updated after a particular order for aggregated items is fulfilled. This can occur on a continuous basis.

In step 632, the machine learning model can be updated using the order data. This can also occur on a continual basis.

As noted above, in embodiments, items to be bundled can be located at a merchant. A machine learning model can be continuously updated and can predict the demand for items that can be aggregated or bundled for a particular geographic area. A daily job predictor that is part of the machine learning model can output the geographical area, the merchant and demand per day. The inventory of items can be filled at the different identified locations on a regular basis (e.g., once per day, every day) based on the predictions. Based on the predicted demand and the current inventories, it is possible to compute and place inventory items and their locations using the inventory management service. Item bundle opportunities can be provided to the end users based on inventory. Later, the transporter is matched to the inventory of items and their locations. When an actual order is placed, the matching service also takes the current state of bundle-able item inventories and matches the transporter with the highest delivery efficiency to obtain the aggregated items in the order to the order.

As noted above, items for bundles of items can be placed with the transporter. The transporter can carry items that might be bundled with items purchased at restaurants in their vehicles. Based on the current order history (as of latest data until a day before), the central server computer can build a machine learning model, which predicts the demand in a particular geographical area. The daily job predictor can output the geographical area, and demand for items per day computed using the machine learning model. The machine learning model can be updated every day. The inventories of items can be filled on a regular basis based upon the predictions made by the machine learning model. Based on the demand prediction, and the current inventories from all the transporters, it is possible to compute and place the items with transporters using an information management service. The transporters pick up items for potential bundles of items every time the transporter's shift starts. It is also possible to provide bundles of items for end users to buy based on the current inventories at the transporters or at other locations. This can be done based upon factors such as efficiency and shelf-life. Then, a transporter can be matched to the order based upon the inventory of items that they have, and their location. When an actual order is placed, the match service also takes the current state of bundle-able inventory items and matches the order to the transporter with highest delivery efficiency. Additional unsold inventory items carried by the transporter after the transporter's shift is over can be moved over to transporter's next shift.

In a specific example of the above scenario, the central server computer can determine that certain items (e.g., toilet paper) are commonly bundled items. When a transporter logs in for the day, the central server computer can proactively recommend based on the machine learning model that the transporter collect the toilet paper and locate it in their vehicle. That transporter can then fulfill toilet paper as an add-on bundled item going forward.

As noted above, it is possible to locate items for bundles in machines such as vending machines. Based on the current order history, and the hot spot routes, the central server computer computes the key geographical locations to install vending machines. This can be based on a machine learning model and this computation can occur less frequently (e.g., once a year or once a quarter). Based on the current order history (as of latest data until a day before), the central server computer can build a machine learning model, which predicts demand per geographical area. The daily job predictor that is part of the machine learning model can output the geographical area, and demand of items per day, as computed from the machine learning model. The machine learning model can get updated every day.

Based on the demand prediction and the current inventory from all the transporters, the inventory management service can compute and place the inventory of items with the vending machines in that geographical area. The transporter can pick up the inventory items every time transporter's shift starts, or can do it on a per delivery basis. The central server computer can provide opportunities to the end users from only the available inventory (from inventory management service) for selection and efficiency. When an actual order is placed, the service also takes the current state of bundle-able inventory and matches it to the transporter with the highest efficiency.

It is also possible to combine (i.e., store items at a merchant, with a transporter, and/or at an intermediate location such as a vending machine) any of the above solutions for item location. This can lower delivery times.

Embodiments of the invention have a number of advantages. Embodiments of the invention can provide an aggregate of items to an end user more efficiently and quickly than prior methods. Transporters need not make extra trips to each and every service provider to obtain a bundle of items provided by a number of service providers. As there can be thousands of transporters and service providers, the time and energy savings provided by embodiments of the invention compared to conventional systems is significant.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

training, by a central server computer, a machine learning model comprising a neural network using historical interaction data associated with prior interactions to determine values of model parameters, the historical interaction data associated with the prior interactions comprising at least an identification of items ordered for each historical interaction, and date and time when each historical order was started and fulfilled, to generate the trained machine learning model configured to, based on input interaction data, predict aggregates of items and locations for placing the aggregates of items;

determining, by the central server computer using the trained machine learning model, aggregates of items that are likely to be ordered by end users within a geographical area, wherein the items include perishable items to be stored in a temperature-controlled environment;

determining, by the central server computer, an available storage capacity at one or more first locations of a third party that are within the geographical area for placing the determined aggregates of items, the determining the available storage capacity comprising:

determining that the one or more first locations comprise a temperature-controlled storage section suitable for storing the perishable items of the determined aggregates of items, and determining the available storage capacity at the temperature-controlled storage section of each of the one or more first locations by receiving one or more detection signals provided by one or more sensors detecting the available storage capacity at the temperature-controlled storage section of each of the one or more first locations, the one or more sensors are disposed at the temperature-controlled storage section of each of the one or more first locations;

initiating, by the central server computer, placement of the items in the aggregates of items at the one or more first locations based on locations of the end users;

after the placement of the items in the aggregates of items at the one or more first locations, receiving, by the central server computer, a set of requests for user-requested aggregates of items from computing devices of at least some end users among the end users, wherein at least one request of the set of requests for the user-requested aggregates is for perishable items and non-perishable items;

initiating, by the central server computer, fulfillment of the requests of the set of requests, wherein the perishable items of the at least one request for the user-requested aggregates of items are at the one or more first locations of the third party;

after the fulfillment of the requests of the set of requests, updating, by the central server computer, the machine learning model using interaction data associated with the user-requested aggregates of items that are fulfilled, the updating comprising updating the values of model parameters, to generate an updated machine learning model;

after updating the machine learning model, determining again, by the central server computer using the updated machine learning model, updated aggregates of items that are likely to be ordered by the end users within the geographical area and one or more second locations of the third party within the geographical area for placing the updated aggregates of items;

initiating, by the central server computer, placement of the items in the updated aggregates of items at the one or more second locations based on locations of the end users;

displaying, by the central server computer on a user device operated by an end user associated with a physical location, the updated aggregates of items via an application interface screen displayed on the user device;

receiving, by the central server computer, a signal corresponding to a user selection input, the user selection input being provided via the application interface screen and indicating a selection of one of the updated aggregates of items stored at the one or more second locations; and in response to the receiving the signal, sending, by the central server computer to a transporter device, a request to deliver the one of the updated aggregates of items from the one or more second locations to the physical location, wherein the one of the updated aggregates of items is thereafter delivered to the physical location, wherein the one or more first locations and the one or more second locations at least partially overlap or different.

2. The method of claim 1, wherein any of the one or more first locations and any of the one or more second locations comprise a service provider location, a transporter vehicle, and/or a vending machine.

3. The method of claim 1, wherein initiating the fulfillment of the requests further comprises communicating with one or more transporters using cars to deliver the aggregates of items to the at least some of the end users.

4. The method of claim 1, wherein initiating the placement of the items in the aggregates of items at the one or more first locations further comprises communicating with service providers and transporters to place the items in the aggregates along predicted routes.

5. The method of claim 1, wherein initiating the fulfillment of the requests comprises initiating the fulfillment of the request for one of the aggregates of items by communicating with one or more service providers that can fulfill one or more of the items in the aggregate.

6. The method of claim 5, wherein initiating the fulfillment of the requests further comprises communicating with one or more transporters to deliver the aggregates of items to the at least some of the end users.

7. A central server computer comprising:

a processor; and a non-transitory computer readable medium comprising code, executable by the processor for performing operations including:

training a machine learning model comprising a neural network using historical interaction data associated with prior interactions to determine values of model parameters, the historical interaction data associated with the prior interactions comprising at least an identification of items ordered for each historical interaction, and date and time when each historical order was started and fulfilled, to generate the trained machine learning model configured to, based on input interaction data, predict aggregates of items and locations for placing the aggregates of items;

determining, using the trained machine learning model, aggregates of items that are likely to be ordered by end users within a geographical area, wherein the items include perishable items to be stored in a temperature-controlled environment;

determining an available storage capacity at one or more first locations of a third party that are within the geographical area for placing the determined aggregates of items, the determining the available storage capacity including:

determining that the one or more first locations comprise a temperature-controlled storage section suitable for storing the perishable items, and of the determined aggregates of items, and determining the available storage capacity at the temperature-controlled storage section of each of the one or more first locations by receiving one or more detection signals provided by one or more sensors detecting the available storage capacity at the temperature-controlled storage section of each of the one or more first locations, the one or more sensors are disposed at the temperature-controlled storage section of each of the one or more first locations;

initiating placement of the items in the aggregates of items at the one or more first locations based on locations of the end users;

after the placement of the items in the aggregates of items at the one or more first locations, receiving a set of requests for user-requested aggregates of items from computing devices of at least some end users among the end users, wherein at least one request of the set of requests for the user-requested aggregates is for perishable items and non-perishable items;

initiating fulfillment of the requests of the set of requests, wherein the perishable items of the at least one request for the user-requested aggregates of items are at the one or more first locations of the third party;

after the fulfillment of the requests of the set of requests, updating the machine learning model using interaction data associated with the user-requested aggregates of items that are fulfilled, the updating including updating the values of model parameters, to generate an updated machine learning model;

after updating the machine learning model, determining again, using the updated machine learning model, updated aggregates of items that are likely to be ordered by the end users within the geographical area and one or more second locations of the third party within the geographical area for placing the updated aggregates of items;

initiating placement of the items in the updated aggregates of items at the one or more second locations based on locations of the end users;

displaying, on a user device operated by an end user associated with a physical location, the updated aggregates of items via an application interface screen displayed on the user device;

receiving a signal corresponding to a user selection input, the user selection input being provided via the application interface screen and indicating a selection of one of the updated aggregates of items stored at the one or more second locations; and in response to the receiving the signal, sending, to a transporter device, a request to deliver the one of the updated aggregates of items from the one or more second locations to the physical location, wherein the one of the updated aggregates of items is thereafter delivered to the physical location,

wherein the one or more first locations and the one or more second locations at least partially overlap or different.

8. The central server computer of claim 7, wherein any of the one or more first locations and any of the one or more second locations comprise a service provider location, a transporter vehicle, and/or a vending machine.

9. The central server computer of claim 7, wherein initiating the placement of the items in the aggregates of items at the one or more first locations further includes communicating with service providers and transporters to place the items in the aggregates along predicted routes.

10. The central server computer of claim 7, wherein initiating the fulfillment of the requests includes initiating the fulfillment of the request for one of the aggregates of items by communicating with one or more transporters to deliver the one of the aggregates of items to one of the end users.

11. A system comprising:
a central server computer comprising
a processor, and
a non-transitory computer readable medium comprising code, executable by the processor for performing operations including:
training a machine learning model comprising a neural network using historical interaction data associated with prior interactions to determine values of model parameters, the historical interaction data associated with the prior interactions comprising at least an identification of items ordered for each historical interaction, and date and time when each historical order was started and fulfilled, to generate the trained machine learning model configured to, based on input interaction data, predict aggregates of items and locations for placing the aggregates of items;
determining, using the trained machine learning model, aggregates of items that are likely to be ordered by end users within a geographical area, wherein the items include perishable items to be stored in a temperature-controlled environment;
determining an available storage capacity at one or more first locations of a third party that are within the geographical area for placing the determined aggregates of items, the determining the available storage capacity including:
determining that the one or more first locations comprise a temperature-controlled storage section suitable for storing the perishable items of the determined aggregates of items, and
determining the available storage capacity at the temperature-controlled storage section of each of the one or more first locations by receiving one or more detection signals provided by one or more sensors detecting the available storage capacity at the temperature-controlled storage section of each of the one or more first locations, the one or more sensors are disposed at the temperature-controlled storage section of each of the one or more first locations;

initiating placement of the items in the aggregates of items at the one or more first locations based on locations of the end users;
after the placement of the items in the aggregates of items at the one or more first locations, receiving a set of requests for user-requested aggregates of items from computing devices of at least some end users among the end users, wherein at least one request of the set of requests for the user-requested aggregates is for perishable items and non-perishable items;
initiating fulfillment of the requests of the set of requests, wherein the perishable items of the at least one request for the user-requested aggregates of items are at the one or more first locations of the third party;
after the fulfillment of the requests of the set of requests, updating the machine learning model using interaction data associated with the user-requested aggregates of items that are fulfilled, the updating including updating the values of model parameters, to generate an updated machine learning model;
after updating the machine learning model, determining again, using the updated machine learning model, updated aggregates of items that are likely to be ordered by the end users within the geographical area and one or more second locations of the third party within the geographical area for placing the updated aggregates of items;
initiating placement of the items in the updated aggregates of items at the one or more second locations based on locations of the end users;
displaying, on a user device operated by an end user associated with a physical location, the updated aggregates of items via an application interface screen displayed on the user device;
receiving a signal corresponding to a user selection input, the user selection input being provided via the application interface screen and indicating a selection of one of the updated aggregates of items stored at the one or more second locations; and
in response to the receiving the signal, sending, to a transporter device, a request to deliver the one of the updated aggregates of items from the one or more second locations to the physical location, wherein the one of the updated aggregates of items is thereafter delivered to the physical location,
wherein the one or more first locations and the one or more second locations at least partially overlap or different.

12. The system of claim 11, further comprising a logistics platform in operative communication with the central server computer.

13. The system of claim 11, wherein any of the one or more first locations and any of the one or more second locations comprise service provider locations.

14. The method of claim 1, wherein the transporter device is an autonomous vehicle that is configured to automatically deliver the one of the updated aggregates of items to the physical location.

* * * * *